No. 636,677. Patented Nov. 7, 1899.
J. W. LINAM & T. J. WHITWORTH.
CORN OR COTTON PLANTER.
(Application filed Jan. 10, 1899.)

(No Model.) 2 Sheets—Sheet 1.

Witnesses
J. L. Edwards Jr.
H. F. Binhorf

J. W. Linam  Inventors
T. J. Whitworth

By their Attorneys,
C. A. Snow & Co.

No. 636,677. Patented Nov. 7, 1899.
J. W. LINAM & T. J. WHITWORTH.
CORN OR COTTON PLANTER.
(Application filed Jan. 10, 1899.)

(No Model.) 2 Sheets—Sheet 2.

Witnesses
J. L. Edwards Jr.
H. Bunker

Inventors
J. W. Linam
T. J. Whitworth

By their Attorneys,
C. A. Snow & Co.

UNITED STATES PATENT OFFICE.

JOHN W. LINAM AND THOMAS J. WHITWORTH, OF LANEPORT, TEXAS.

CORN OR COTTON PLANTER.

SPECIFICATION forming part of Letters Patent No. 636,677, dated November 7, 1899.

Application filed January 10, 1899. Serial No. 701,744. (No model.)

*To all whom it may concern:*

Be it known that we, JOHN W. LINAM and THOMAS J. WHITWORTH, citizens of the United States, residing at Laneport, in the county of Williamson and State of Texas, have invented a new and useful Corn or Cotton Planter, of which the following is a specification.

Our invention relates to improvements in corn and cotton planters; and the object that we have in view is to provide a planter mechanism which may be used in connection with an ordinary sulky cultivator or plow to enable the operator to ride on the machine when planting the grain, whereby the machine is especially adapted for service in the southern section of this country, where the soil is of a heavy, black, and sticky nature that renders it exceedingly inconvenient and laborious for the attendant to walk in the furrow.

A further object of the invention is to so mount the planting mechanism on the sulky plow or cultivator as to secure vertical adjustment of the planter with the elevation or lowering of the cultivator-beams by the ordinary appliances of the machine, and also to arrange the planting mechanism so that it may swing horizontally a limited distance by pressure of the operator's foot for the purpose of keeping the planter in proper relation to the furrow should the team swerve to one side or the other in driving across the field.

A further object of the invention is to provide an improved furrow-opening means which is not liable to be broken when it comes in engagement with an obstruction and which will serve to open a deep furrow for the deposit of the seed in order to prevent scattering thereof and to plant the seed so deeply in the ground as to insure its germination and to protect the seed from droughts and from foreign vegetable growths.

With these ends in view the invention consists in the novel combination of elements and in the construction and arrangement of parts, which will be hereinafter fully described and claimed.

To enable others to understand the invention, we have illustrated the preferred embodiment in the accompanying drawings, forming a part of this specification, and in which—

Figure 1:
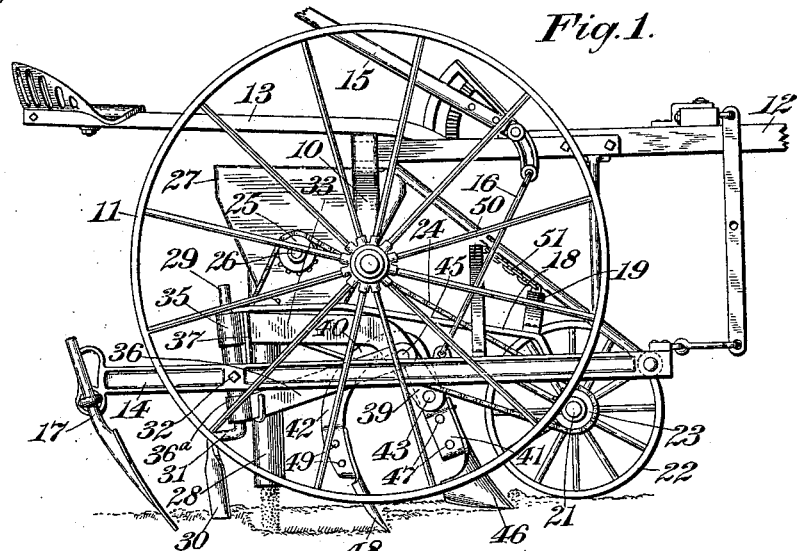
Figure 2:
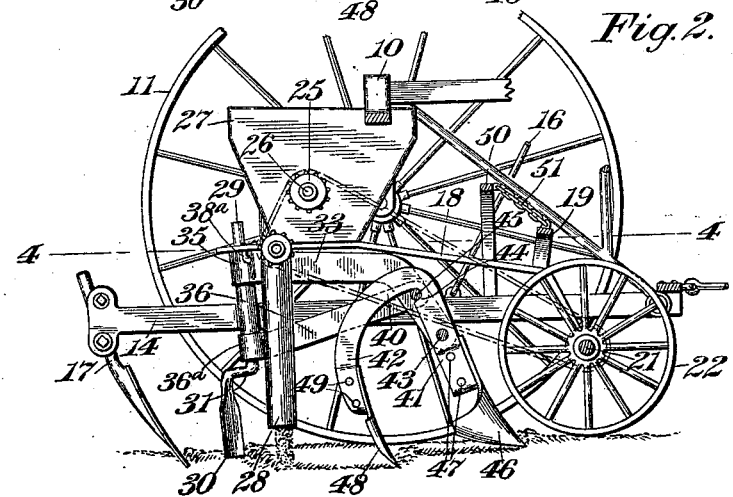
Figure 3:
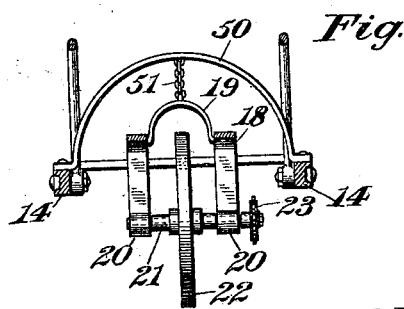
Figure 4:
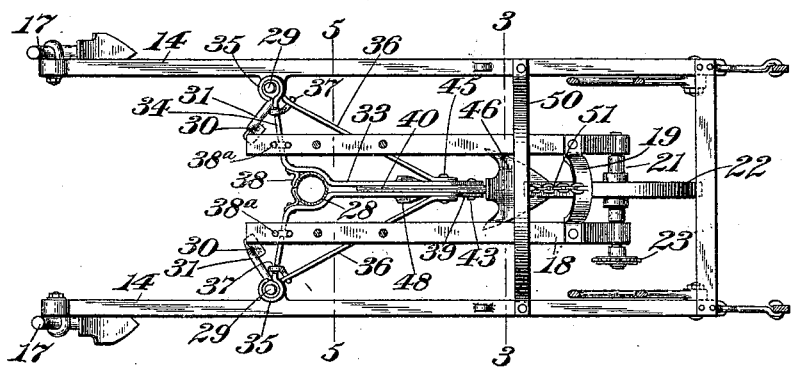
Figure 5:
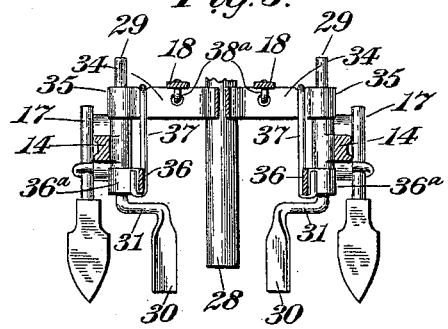
Figure 6:
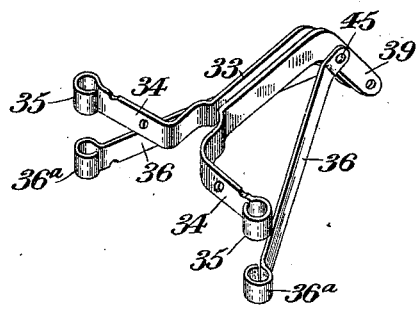
Figure 7:
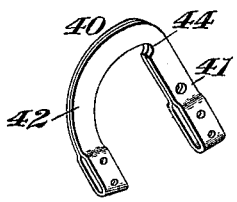

Figure 1 is a side elevation illustrating our improved planter mechanism applied to an ordinary sulky plow or cultivator. Fig. 2 is a vertical longitudinal sectional elevation thereof. Fig. 3 is a vertical cross-section through the machine on the plane of the ground-wheel and indicated by the dotted line 3 3 of Fig. 4. Fig. 4 is a horizontal sectional plan view on a plane above the planter mechanism and indicated by the dotted line 4 4 of Fig. 2. Fig. 5 is another vertical cross-section through the machine, taken on the plane of the covering-shovels and indicated by dotted lines 5 5 of Fig. 4. Fig. 6 is a detail perspective view of the frame which supports the carrier for the furrow-opener or shovel. Fig. 7 is a like view of the carrier for the furrow-openers.

Like numerals of reference denote like and corresponding parts in each of the several figures of the drawings.

The arch 10 of an ordinary cultivator is provided with spindles for the reception of the carrying-wheels 11, and to this arched part of the machine, which constitutes the axle, are connected the draft-tongue 12 and the supporting-frame 13 for the driver's seat. The cultivator-beams 14 are similar to ordinary devices in the art, and they are connected with the adjusting-levers 15 by the links 16. As is usual, the beams 14 carry the rear stocks 17; but in adapting our planter mechanism to a sulky plow or cultivator we remove the ordinary front and middle stocks from the cultivator-beams, to the end that the planter mechanism may be used in connection with the ordinary cultivator. As the novelty in the present invention resides in the planter mechanism and the parts associated therewith, we do not consider it necessary to more fully describe the ordinary sulky-plow.

In carrying our invention into practice we employ a planter-frame which carries the hopper and is supported partly by a ground-wheel that furnishes the motive power by which the planter mechanism is operated. This planter-frame is shown as consisting of parallel metallic bars 18, which are united firmly together at their front ends by means of an arch 19, having its ends secured by bolts to the bars of the planter-frame in order to maintain them in parallelism, and this arch is arranged to span the ground-wheel in order to permit the latter to rotate freely without hindrance from the arch. The front ends of the bars forming the planter-frame are curved or extended downwardly in advance of the arch for the purpose of supporting the journal-bearings 20, that accommodate the axle 21 of the ground-wheel 22, and to this axle is secured the sprocket-pinion 23, that drives the endless sprocket-chain 24, which propels the sprocket-wheel 25 of the operating elements of the planter. These operating elements may be of any preferred construction known to those skilled in the art, and one element of the planter mechanism is a shaft 26, that is driven by the sprocket-gear 25 and which is mounted on the hopper 27, that is carried by the planter-frame 18. As is usual in the art, the hopper has a discharge-opening for the seed or grain, and a delivery spout or tube 28 is supported on the planter to have its upper end receive the grain or seed from the opening in the hopper 27.

To the cultivator-beams 14 are firmly clamped the vertical spindles 29, which lie in rear of the delivery spout or tube 28 and are arranged on opposite sides thereof, and these spindles carry the covering-shovels 30, which are inclined reversely to each other for the purpose of throwing the soil inwardly upon the seed deposited in the furrow. Each spindle is provided at a point intermediate of its length with an angular bend 31, which constitutes a crank, and the upper straight part of each spindle is attached to one of the cultivator-beams by a clamping-bolt 32, which permits the spindle to be adjusted axially on the beam for the purpose of adjusting the cranked lower end of the spindle and the covering-shovels 30 thereon toward or from the plane of the seed-delivery tube or spout 28. It is evident that the cranked spindles may be adjusted independently of each other and at variable positions with relation to the plane of the tube or spout 28 to throw more or less soil upon the furrow.

For the purpose of supporting the furrow-openers we employ a supporting-frame 33, which is represented more clearly by Fig. 6 of the drawings. This frame 33 is provided at its rear end with the oppositely-diverging arms 34, and the outer ends of these arms have clips 35, which are fitted loosely on the upper ends of the spindles 29, the latter being extended above the cultivator-beams 14 for the reception of the supporting-frame 33. To the front end of this frame 33 are connected the diverging braces 36, which have clips 36ª at their rear ends, that are fitted loosely to the spindles 29 between the clamps 32 and the cranks 31 of the spindles, and these braces are connected loosely with the diverging arms 34 of the shovel-frame by means of the stirrups 37. The seed-delivery spout or tube 28 is confined in proper relation to the frame 33 by means of the clamp 38, and the rear end of the planter-frame 18 is loosely connected with the arms 34 of the shovel-frame 33 by the connecting-links 38ª. This shovel-frame 33 is, furthermore, provided at its front end with a downwardly and forwardly inclined hanger 39, which supports the arched shovel-carrier 40. This shovel-carrier is a single piece of metal fashioned to provide the connected front and rear arms 41 42, and said arched carrier 40 is pivotally supported at 43 in the hanger 39 of the shovel-frame 33. The shovel-carrier 40 is constructed with a notch 44 above its pivotal connection 43 to the hanger 39, and in this notch of the pivoted carrier is fitted a brake-pin 45, which serves to connect the braces to the hanger 39 and to retain the pivoted shovel-carrier in its proper position on the frame 33. The front arm 41 of the shovel-carrier has a furrow-opener or sweep 46 secured firmly thereto by a bolt 47, and this bolt may be removed for the purpose of taking off the opener and replacing it by a shovel of the desired size in order to open the furrow a proper width to receive the seed or grain from the hopper of the planter mechanism. The rear arm 42 of the shovel-carrier has a narrow shovel 48 attached thereto by a bolt 49, and this rear shovel is in alinement with the opener 46 and is arranged or adjusted to travel in the path of the furrow opened by said shovel 46. The rear shovel 48 serves to deepen the furrow opened by the front shovel 46 and enables the seed or grain from the tube or spout 28 to be deposited quite deeply in the soil.

To maintain the cultivator-beams 14 in parallel relation one to the other, we provide a coupling 50, which is attached to the beams 14 and lies in rear of the coupling-arch 19, which unites the side bars that constitute the planter-frame 18, and the arch 19 of the planter-frame is connected by a chain or link connection 51 with the arch 50 of the cultivator-beams, whereby this chain or link connection 51 serves to stay the front end of the planter-frame and as a guide to the planter-frame in the lateral or horizontal adjustment thereof.

By raising the cultivator-levers the entire planter mechanism may be lowered with the cultivator-beams to bring the planter into condition for service and to regulate the penetration of the shovels thereof as well as the depth of planting of the seed; but by depressing the cultivator-levers the beams and planter mechanism may be raised out of service. Our improved planter mechanism enables the operation of planting the field to be performed economically by saving the labor of one attendant and one of the draft-horses. In plowing the soil it is customary to use two horses to draw the implement for the purpose of opening the furrows for planting the seed and to follow up this operation by a one-horse planter in order to deposit the seed at the proper depth in the moist earth. A machine of the character herein described dispenses with the operation of first plowing the ground and subsequently depositing the seed therein, because these operations may be effected simultaneously and the driver can ride on the machine, thus overcoming the necessity for walking in the heavy soil. It is evident that different sizes of furrow-openers can be attached to the shovel-carrier to suit the conditions of the soil and the nature of the work. The planter mechanism of our invention is suspended on the cultivator-beams in a manner to maintain the various parts of the planter mechanism in parallel relation, and the beams of the cultivator are also held parallel to each other while the planter mechanism is suspended between the cultivator-beams for the purpose of being adjusted a limited distance in the horizontal plane by the foot of the operator, so as to compensate for any swerving or deflection of the team, which would tend to throw the planter off the center of the ridge or row. By suspending the planter mechanism so that it has parallel movement at each end it may easily be guided to the right or left by slight pressure of the operator's foot, and hence if the team is driven out of line the planter mechanism may readily be adjusted to keep it in its proper position.

Changes may be made in the form and proportion of some of the parts, while their essential features are retained and the spirit of the invention embodied. Hence we do not desire to be limited to the precise form of all the parts as shown, reserving the right to vary therefrom.

Having thus described the invention, what we claim is—

1. The combination with cultivator-beams, of a planter-frame loosely connected with said beams and free to swing laterally at its forward end, and a ground-wheel supported at the front end of said planter-frame and adapted to move laterally therewith, substantially as described.

2. The combination with cultivator-beams, of a coupling-arch united to said beams, a planter-frame connected at its rear end with the beams and supported at its front end by a ground-wheel, and a flexible connection between the planter-frame and the coupling-arch permitting the forward end of the planter-frame to swing laterally, substantially as described.

3. The combination with cultivator-beams, of spindles connected to said beams and carrying the covering-shovels, and a wheeled planter-frame loosely connected with said spindles and free to swing laterally at its forward end, substantially as described.

4. The combination with cultivator-beams, of axially-adjustable cranked spindles clamped to said cultivator-beams, shovels carried by said spindles and a wheeled planter-frame loosely connected with and supported upon the spindles, for the purpose described, substantially as set forth.

5. The combination with cultivator-beams, and shovel-spindles adjustably supported thereon, of a shovel-carrying frame connected to and adjustable relatively upon said spindles, and a wheeled planter-frame connected to the shovel-frame and flexibly connected to the cultivator-frame, substantially as described.

6. The combination with cultivator-beams, of a shovel-frame, independent axially-adjustable spindles connecting the shovel-frame to the cultivator-beams, shovels on said spindles, a furrow-opener shovel carried by the shovel-frame, and a planter-frame connected to the shovel-frame at one end with its other end free to swing laterally and having a supporting-wheel, substantially as described.

7. The combination with cultivator-beams, of a coupling-arch fast with said beams, shovel-spindles clamped to said beams, a planter-frame having loose connections at one end with the shovel-spindles and provided at its opposite end with a carrying-wheel, an arch united to the members of the planter-frame and having a linked connection with the coupling-arch of said beams, and means for adjusting the beams vertically, substantially as described.

8. The combination with beams and a planter mechanism, of cranked or offset spindles carrying the covering-shovels, and clamps which unite the spindles fast to the beams and permit the spindles to be adjusted axially to vary laterally the position of the shovels relatively to the plane of the planter mechanism, substantially as described.

9. The combination with a planter mechanism having a seed tube or spout, of a pivoted double-armed carrier, an opener-shovel attached to one arm of the carrier, another furrow-shovel carried by the other arm of said carrier in rear of the opener-shovel, and a breakable pin engaging with the pivoted carrier whereby both shovels may swing out of the way when either meets an obstruction, substantially as described.

In testimony that we claim the foregoing as our own we have hereto affixed our signatures in the presence of two witnesses.

JOHN W. LINAM.
THOMAS J. WHITWORTH.

Witnesses as to Linam:
C. B. CHALLMUER,
TRAVIS SHAW.

Witnesses as to Whitworth:
C. L. STANFORD,
G. T. WILSON.